US006944148B1

United States Patent
Gehring et al.

(10) Patent No.: US 6,944,148 B1
(45) Date of Patent: Sep. 13, 2005

(54) APPARATUS AND METHOD FOR MANAGING VARIABLE-SIZED DATA SLOTS WITHIN A TIME DIVISION MULTIPLE ACCESS FRAME

(75) Inventors: Stephan W. Gehring, Palo Alto, CA (US); Krisnawan Rahardja, San Jose, CA (US); Carlton J Sparrell, Palo Alto, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 0 days.

(21) Appl. No.: 09/393,122

(22) Filed: Sep. 10, 1999

(51) Int. Cl.[7] .......................................... H04B 7/212
(52) U.S. Cl. ...................................... 370/347; 370/422
(58) Field of Search ................................ 370/280, 277, 370/294, 321, 470, 471, 503, 508, 509, 510, 370/347–349, 442, 443, 345, 337, 338, 465

(56) References Cited

U.S. PATENT DOCUMENTS

| 4,201,892 | A |   | 5/1980  | Schmidt .................... 370/104 |
|-----------|---|---|---------|--------------------------------------|
| 4,586,177 | A |   | 4/1986  | Kaul ........................ 370/104 |
| 4,587,494 | A |   | 5/1986  | Widlar ...................... 330/273 |
| 4,672,608 | A | * | 6/1987  | Ball et al. .................. 370/346 |
| 4,887,266 | A |   | 12/1989 | Neve et al. ................. 370/95.1 |
| 4,979,186 | A |   | 12/1990 | Fullerton .................... 375/23 |
| 5,146,616 | A |   | 9/1992  | Tang et al. .................. 455/103 |
| 5,159,343 | A |   | 10/1992 | Harmuth |
| 5,253,202 | A |   | 10/1993 | Bronner et al. ........... 365/189.01 |
| 5,274,271 | A |   | 12/1993 | McEwan .................... 307/108 |
| 5,307,079 | A |   | 4/1994  | Ross et al. ................. 343/822 |
| 5,319,218 | A |   | 6/1994  | Kim et al. ..................... 257/1 |
| 5,355,374 | A |   | 10/1994 | Hester et al. ................. 370/84 |
| 5,363,108 | A |   | 11/1994 | Fullerton .................... 342/27 |
| 5,473,668 | A |   | 12/1995 | Nakahara ..................... 379/58 |
| 5,537,414 | A |   | 7/1996  | Takiyasu et al. ........... 370/95.1 |
| 5,546,022 | A |   | 8/1996  | D'Souza et al. .............. 326/87 |
| 5,594,738 | A | * | 1/1997  | Crisler et al. ................ 370/347 |
| 5,627,829 | A |   | 5/1997  | Gleeson et al. ............. 370/230 |
| 5,644,576 | A |   | 7/1997  | Bauchot et al. ............. 370/437 |
| 5,677,927 | A |   | 10/1997 | Fullerton et al. ........... 375/200 |
| 5,687,169 | A |   | 11/1997 | Fullerton .................... 370/324 |
| 5,687,200 | A |   | 11/1997 | Berger ....................... 375/363 |
| 5,742,592 | A |   | 4/1998  | Scholefield et al. ........ 370/329 |
| 5,748,891 | A |   | 5/1998  | Fleming et al. |
| 5,790,551 | A |   | 8/1998  | Chan ......................... 370/458 |
| 5,815,537 | A |   | 9/1998  | Janssen ....................... 375/350 |
| 5,832,035 | A |   | 11/1998 | Fullerton .................... 375/210 |

(Continued)

FOREIGN PATENT DOCUMENTS

EP  0 307 962 A2  3/1989 ............ H04B 7/24

(Continued)

OTHER PUBLICATIONS

J. Husted et al., "A Time-Division Multiple-Access System For The Defense Satellite Comminication System", 1970 *Eascon*, pp. 229-237, Oct. 1970.

(Continued)

*Primary Examiner*—Ajit Patel
*Assistant Examiner*—Chirag Shah
(74) *Attorney, Agent, or Firm*—Pulse-Link, Inc.

(57) ABSTRACT

A reliable Medium Access Control layer protocol and method employing centralized management of communication in a Time Division Multiple Access network architecture. The Medium Access Control layer protocol implements Quality of Service guaranties to the layers of the Open Systems Interconnection reference model above the Medium Access Control layer by providing guaranteed bandwidth links within the bandwidth range specified by those layers. The Medium Access Control layer protocol further provides variable data slot requisition, variable data slot allocation, dynamic data slot reallocation, and data slot deallocation.

9 Claims, 6 Drawing Sheets

U.S. PATENT DOCUMENTS

| | | | |
|---|---|---|---|
| 5,901,172 A | 5/1999 | Fontana et al. | 375/200 |
| 5,909,469 A | 6/1999 | Frodigh et al. | 375/302 |
| 5,920,278 A | 7/1999 | Tyler et al. | |
| 5,926,501 A | 7/1999 | Souissi et al. | 375/200 |
| 5,940,452 A | 8/1999 | Rich | 375/347 |
| 5,952,956 A | 9/1999 | Fullerton | 342/27 |
| 5,953,344 A | 9/1999 | Dail et al. | 370/443 |
| 5,960,000 A | 9/1999 | Ruszczyk et al. | 370/447 |
| 5,970,062 A | 10/1999 | Bauchot | 370/345 |
| 5,977,822 A | 11/1999 | Rybicki et al. | 329/313 |
| 6,002,708 A | 12/1999 | Fleming et al. | |
| 6,014,374 A | 1/2000 | Paneth et al. | 370/345 |
| 6,026,125 A | 2/2000 | Larrick, Jr. et al. | |
| 6,031,862 A | 2/2000 | Fullerton et al. | 375/200 |
| 6,041,051 A * | 3/2000 | Doshi et al. | 370/352 |
| 6,055,411 A | 4/2000 | Ishida et al. | 455/11.1 |
| 6,091,717 A | 7/2000 | Honkasalo et al. | 370/329 |
| 6,094,464 A | 7/2000 | Ebringer et al. | 375/342 |
| 6,097,707 A * | 8/2000 | Hodzic | 370/321 |
| 6,133,875 A | 10/2000 | Kishimoto | |
| 6,133,876 A | 10/2000 | Fullerton et al. | |
| 6,226,277 B1 | 5/2001 | Chuah | 370/328 |
| 6,243,583 B1 | 6/2001 | Tsutsui et al. | 455/442 |
| 6,246,377 B1 | 6/2001 | Aiello et al. | 343/770 |
| 6,246,702 B1 * | 6/2001 | Fellman et al. | 370/503 |
| 6,278,713 B1 * | 8/2001 | Campbell | 370/417 |
| 6,285,662 B1 * | 9/2001 | Watanabe | 370/280 |
| 6,285,873 B1 | 9/2001 | Quick, Jr. | 455/422 |
| 6,300,903 B1 | 10/2001 | Richards et al. | |
| 6,347,084 B1 | 2/2002 | Hulyalkar et al. | 370/347 |
| 6,351,652 B1 | 2/2002 | Finn et al. | |
| 6,424,645 B1 * | 7/2002 | Kawabata et al. | 370/347 |
| 6,633,558 B1 * | 10/2003 | Cho et al. | 370/348 |

FOREIGN PATENT DOCUMENTS

| | | | | |
|---|---|---|---|---|
| EP | 0 817 399 A2 | 1/1998 | | H04B 3/54 |
| EP | 0 825 794 A2 | 2/1998 | | |
| EP | 0 817 399 A3 | 7/1998 | | |
| EP | 0 825 794 A3 | 1/2000 | | |
| EP | 0 307 962 A3 | 5/2000 | | |
| WO | WO 91/07030 A1 | 5/1991 | | H04J 3/26 |
| WO | WO 95/23461 A1 | 8/1995 | | H04B 10/10 |
| WO | WO 97/21294 A2 | 6/1997 | | H04L 12/28 |
| WO | WO 98/27670 A1 | 6/1998 | | H04B 7/08 |
| WO | WO 01/93434 A2 | 10/2001 | | |

OTHER PUBLICATIONS

L. Roberts, "Aloha Packet System With and Without Slots and Capture", *Computer Communication Review*, vol. 5, No. 2, pp. 28-41, Apr. 1975.

"IEEE Standards for Local Area Networks: Carrier Sense Multiple Access with Collision Detection", ANSI/IEEE Std. 802.3-1985, The Institute of Electronic and Electrical Engineers, pp. 1-143, Dec. 1984.

B. Schneier, *Applied Cryptography*, Chapter 10, Sec. 10.3, 12.2, pp. 216-220, 270-278, John Wiley & Sons, Inc., Oct. 1995.

"Information technology-Open Systems Interconnection-Basic Reference Model: The Basic Mode", *ISO/IEC 7498-1:1994(E)*, pp. 1-59, corrected and reprinted Jun. 15, 1996.

"Radio Equipment and Systems (RES); High Performance Radio Local Area Network (HIPERLAN), Type 1 Functional specification", European Telecommunication Standards Institute, pp. 1-115, Dec. 1997.

M. Win, "ATM-Based TH-SSMA Network for Multimedia PCS", *IEEE Journal on Selected Areas in Communication*, vol. 17, No. 5, pp. 824-836, May 1999.

Stephan Gehring et al., "Medium Access Control Protocol For Centralized Wireless Network Communication Management", 44 pp. Specification, 4 pp. Claims, 1 p. Abstract, 11 Drawing Sheets, 09/393,121 filed Sep. 10, 1999, PLNK-005.

* cited by examiner

APPARATUS AND METHOD FOR MANAGING VARIABLE-SIZED DATA SLOTS WITHIN A TIME DIVISION MULTIPLE ACCESS FRAME

BACKGROUND OF THE INVENTION

1. Field of the Invention

This invention pertains generally to Medium Access Control layer protocol implementations. More particularly, the invention is a Medium Access Control protocol implementation and method for use in a Time Division Multiple Access network system having a network master device and a plurality of slave devices. The protocol provides dynamic data slot management, including variable data slot requisition, variable data slot allocation, dynamic data slot reallocation, and data slot deallocation.

2. The Prior Art

Presently, there are numerous ways to provide communication methods between devices participating in a network offering various levels of reliability and effectiveness. Likewise, various communication protocols have been developed to provide various networking services to such network devices.

In an effort to standardize protocols in network communication, the International Standards Organization (ISO) developed the Open Systems Interconnection (OSI) reference model. The OSI reference model deals with connecting systems that are open for communication with other systems and includes seven layers of network services including the Application or "highest" layer, the Presentation layer below the Application layer, the Session layer below the Presentation layer, the Transport layer below the Session layer, the Network layer below the Transport layer, the Data Link layer below the Network layer, and the Physical or "lowest" layer below the Data Link layer.

The Data Link layer is designed to offer various services to the Network layer. The principal service that the Data Link layer provides to the Network layer is the transfer of data from the Network layer on a source device to the Network layer on the destination or target device. The usual approach is for the Data Link layer to break up the bit stream into discrete blocks of bits, compute a checksum for each block, and transmit the block along with the checksum to the target device in the form of a packet. When the packet arrives at the target device, the checksum is recomputed for the received block. If the newly computed checksum is different from the one received from the source device, the Data Link layer determines that an error has occurred and an error-recovery process is invoked.

At the Medium Access Control (MAC) sublayer of the Data Link layer, protocols are used to solve the issue of which network device gets to use the broadcast channel when there is competition for it. The MAC sublayer is particularly important in Local Area Networks (LANs) where the number of network devices competing for the communication channel may comprise hundreds of devices.

Various methods are used at the MAC layer to provide multiple access by such competing devices across a shared medium. One common method used for sharing a broadcast channel or medium is Time Division Multiple Access (TDMA). TDMA divides transmit time into frames having a plurality of time slots, wherein each competing device is assigned a unique and non-overlapping "data slot" within the frame in which only the corresponding device may transmit data. Each data slot within the frame has the same fixed length according to a predetermined frame definition, regardless of the bandwidth capabilities of the various devices of the network. Thus, a first device having large bandwidth requirements for optimum operation will have the same fixed-length data slot as a second device that requires nominal bandwidth for optimal operation. This scheme creates a non-optimal channel or media use.

A partial solution is to assign two or more data slots to devices requiring more bandwidth than other devices. However, the granularity of the data slots as determined by its length creates a likelihood that a certain amount of transmit time will be wasted in each frame. For example, if the data slot size is 32 bytes and a device chose to transmit 48 bytes per frame, it must allocate two data slots (64 bytes), in order to accommodate 48 bytes, resulting in 33% wasted bandwidth. Apart from the granularity problem, this scheme requires additional management overhead to track each device's data slot assignments.

In certain instances, when traffic on the network is relatively high, all of the data slots in the frame may be completely assigned and unavailable, thus leaving devices without data slot assignments "stranded" without any means to transmit data on the network. Such devices without data slot assignments must wait until a data slot is released and then subsequently compete for it. One solution to this bandwidth problem is to interleave access to frames, wherein data slot assignments are made in an alternating frame assignment fashion. For example, a device may be assigned a particular data slot every other frame, or every third frame, or every $n^{th}$ frame. Such a solution requires additional management overhead to track not only each device's slot assignments, but also, each device's frame interleave assignment. Current MAC layer algorithms fail to address such issues of fragmented data slot assignments, and fail to provide methods for joining or otherwise combining fragmented data slots.

Current solutions at the MAC layer also fail to provide adequate "quality of service" (QoS) guarantees, for example, for communication links whose bandwidth requirements vary over time, to the upper layers of the OSI model. As noted above, the task of each layer of the OSI reference model is to provide services to the next higher layer. For example, the MAC layer provides services to the Network layer. QoS provides a mechanism by which parameters which relate to the "quality" of the services rendered to be passed from the serviced layer (Network layer) to the servicing layer (MAC layer). For example, in audio data transmission, the minimum and maximum bandwidth range for optimal performance would beneficially be a parameter accompanying the data transfer request. This parameter allows the network to dynamically trade off available bandwidth for sound quality. For instance, the transfer of high fidelity or stereo-quality audio data requires larger bandwidth than the transfer of monaural or other low quality audio data. Currently, QoS requests, such as guaranteed bandwidth requests, are not typically channeled through the OSI layers to the MAC layer. For example, a current technology which provides guaranteed bandwidth is Asynchronous Transfer Mode (ATM). However, ATM provides cells (the functional equivalent of "slots") which are of equal size. As described above, providing fixed-sized slots, or in the case of ATM, fixed-sized cells, may result in a portion of a slot going unused (internal fragmentation), or more accurately, wasted. This internal fragmentation is due to the inherent granularity problem created by fixed-sized slots. Prior art MAC layer implementations do not accept such QoS requests for the purpose of dynamically requesting variable or adaptable sized data slots for transmission according to the present state of the device and the network.

Accordingly, there is a need for a reliable MAC layer protocol and method employing centralized management of network communication, which provides quality of service guaranties via variable data slot requisition, which provides variable data slot allocation, and which provides dynamic data slot management. The present invention satisfies these needs, as well as others, and generally overcomes the deficiencies found in the background art.

BRIEF DESCRIPTION OF THE INVENTION

The present invention is a Medium Access Control (MAC) layer protocol and method for use in a network system, which provides centralized management of network communication. The MAC protocol provides a Time Division Multiple Access (TDMA) frame definition, which provides variable-length data slots for transmission. The latter are dynamically allocated, reallocated, and deallocated by a master device to slave devices requesting to transmit data. The MAC layer provides "Quality of Service" (QoS) guaranties to OSI layers above the MAC layer for receiving parameters related to data communication requests. In response to the QoS request from the layers above the MAC, the protocol executing in the source slave device issues a request for a dynamic or adaptable data link having a minimum and a maximum bandwidth associated with such request. The data link request is communicated to a master device for authorization. Responsive to the data link request, the protocol executing in the master device examines the current state of the data slot assignments. If appropriate, the master device reallocates the present data slot designations. The master device then assigns the requesting slave device a variable-length data slot within the frame for data transmission.

In general, the MAC layer protocol of the present invention operates in a network system having a master device and a plurality of slave devices. More particularly, the MAC layer protocol is a software protocol provided and executed in the MAC sublayer of the Data Link layer according to the Open System Interconnect (OSI) standard. The Logical Link Control (LLC) sublayer forms the "top" or "upper" half of the Data Link layer and provides virtual linking services. The MAC sublayer forms the "bottom" or "lower" half of the Data Link layer and provides the services described herein. The software protocol is executed and operates on circuitry or like hardware as is known in the art within the master and the slave devices on the network at the MAC layer.

The present invention provides a Time Division Multiple Access (TDMA) frame definition for the exchange of protocol messages and other network data, which is managed by the master device. In general, the master device carries out the operation of controlling and managing access to the TDMA frame. Before transmitting any network data on the TDMA frame, a requesting or source slave device must first register with the master device and then request authorization to establish a data link with a target device from the master device. Responsive to this data link request, the master verifies that the requested bandwidth is available within the network and that the target device is available to communicate with the requesting device, and then authorizes a data link between the requesting device and the target. The target device is available if it is registered with the master and can receive data from the source device within the negotiated bandwidth range. This arrangement provides for centralized management of the shared network transport between the various devices of the network.

By way of example, and not of limitation, the MAC layer protocol divides data transmission time into discrete data "frames" employing a TDMA frame definition. Frames are further subdivided into "sections". In a presently preferred embodiment, the TDMA frame comprises a Start-Of-Frame section (SOF), a command section, and a data slot section having a plurality of variable-length data slots. The SOF section is used by the master device for defining the start of each new frame so that each slave device can synchronize with the frame structure as set forth by the master device. Additionally, the SOF section may include information for synchronizing clocks in the slave devices to the master clock in the master device. In the preferred embodiment, the master device transmits a unique bit code symbol, which does not appear anywhere else within the frame, in the SOF section to identify the start of each new frame. The unique bit code symbols are used by each of the slave devices on the network to ascertain the beginning of each frame from the incoming data stream.

The command section of the frame is used by the devices of the network for exchanging protocol messages. Generally, a response to a message in the command section is transmitted in the command section of the next immediate frame. In the presently preferred embodiment, the command section operates in a "slotted ALOHA" mode and in a "TDMA" mode as managed by the master device. A detailed treatment of slotted ALOHA protocols is provided by L. G. Roberts in "ALOHA packet system with and without slots and capture," Computer Communication Review, vol. 5, pp. 28–42, April 1975 and is incorporated herein by reference. The present invention employs a modified slotted ALOHA protocol as described in the copending patent application entitled "MEDIUM ACCESS CONTROL PROTOCOL FOR CENTRALIZED WIRELESS NETWORK COMMUNICATION MANAGEMENT" having application Ser. No. 10/427,895, filed Apr. 30, 2003. which is expressly incorporated herein by reference. The slotted ALOHA mode is used by the master device to invite protocol messages from the slave devices. For example, a first slave device may respond to an ALOHA command with a message requesting a data link with a second device into order to transmit data to the second slave device. Other responses to an ALOHA command may include a message indicating the slave device is starting up, shutting down, or is busy. Other protocol message replies or commands as is known in the art may also be used.

When a slave device responds to an ALOHA command, the master and the slave device engage in a protocol sequence assuming the TDMA mode in the command section until the protocol sequence is completed. In this mode, only one of the two devices may transmit in the command section at any given time.

The data slots are used for data transmission between the devices of the network. Generally, the master device dynamically assigns a data slot to a slave device which is requesting to transmit data. The data slot assignment usually comprises a start time for transfer (slot start time) and a length of time for transfer (slot length). The slot start time corresponds to the time position within the data slot section of the frame at which point the device begins its transmission. The slot length measured from the slot start provides the time position within the frame at which transmission is terminated for that the frame. The slot length corresponds to the bandwidth allocated to the device within the data section of the frame.

The length of each data slot assigned is structured and configured to have variable length as dynamically assigned by the master device according to the QoS parameters provided for the bandwidth range. That is, the length of the data slot assigned by the master to a first device may be of different length than a data slot assigned to a second device. The granularity of such length assignment is one (1) bit. Thus the master device can assign data slots in increments of one bit. Normally, the minimum size of a data slot assignment is sufficient to accommodate the slave sync symbols, which are described further below. By providing data slots with varying widths, the master device may assign a wider data slot to slave devices capable of accommodating wider bandwidth transfers. Conversely, the master may assign a narrower data slot to slave devices with correspondingly limited bandwidth. Thus, the structure of the TDMA frame and the utilization of the TDMA frame as set forth by the MAC protocol of the present invention optimize the bandwidth use of the network transport medium.

The master device assigns or allocates a data slot with a length according to an algorithm provided by the present invention. In determining the slot length assignment, this algorithm considers, among other things, the request made by a requesting source slave device which includes certain bandwidth parameters as described below, as well as capabilities of the target device and the bandwidth available in the network.

The MAC protocol software of the present invention executing in a slave device of the network includes an algorithm for handling QoS commands or requests passed from the layers of the OSI reference model above the MAC layer including the Network layer, the Transport layer, the Session layer, the Presentation layer, and the Application layer. Such QoS requests normally accompany a link request in the form a Interface Data Unit (IDU) from the Network layer to transmit or receive data from another device. The QoS request includes information pertinent to the data link request and may include, for example, the size of the data to be transferred, the bandwidth limits (minimum and maximum bandwidth) of the requesting device, or latency requirements. The requesting slave device may also provide a minimum and maximum bandwidth which are of the same value, which would provide backward compatibility with current devices.

A data link request (REQ) is then made to the master device to negotiate for a data slot in the frame. This REQ will include the minimum and maximum bandwidth as requested by the slave device. Other relevant data such as the identity of the source slave device and the target slave device will also accompany the REQ request as is known in the art.

Responsive to the REQ request received from the source slave device, the master device analyzes the current data slot assignments within the frame. For this purpose, the MAC protocol software executing in the master device includes algorithms for dynamically reallocating (or reorganizing) the current data slots in the frame and algorithms for assigning a corresponding slot start time and length to a requesting slave device according to the minimum and maximum bandwidth as given in the REQ request as well as the currently available bandwidth in the network.

For the present invention, the term "reallocating" is analogous with the term "reorganizing" with respect to the data slots assignments in the frame. As described in further detail below, reallocating may include a reassignment of slot start time and/or a reassignment of slot length.

The reallocation algorithm provides reassignment of current data slot assignments. Reallocation is appropriate in a variety of circumstances. One such circumstance arises when the current data slot assignments are scattered across the entire data slot section creating a plurality of disjoint free time blocks within the data slot section.

The present invention provides an algorithm to consolidate the disjoint free time blocks by reallocating the current data slots. This reallocation algorithm also may modify the existing data slot length assignment to accommodate "room" or space for the new data slot request. This new length assignment is typically communicated as a new slot length within the bandwidth range negotiated during the data link setup. The master device communicates a data slot reassignment message to the source and target slave devices which have current data slot assignments in the frame. This reassignment message includes the new slot start time if the slot start time is modified, and the new slot length if the length of time for transfer is modified. In response to this reassignment message, the slave devices will acknowledge to the master this changed state and will resume data transfer at the newly assigned slot start time and slot length.

In certain instances, data slot reallocation may increase the data slot length to devices which have current data slot assignments thus providing more bandwidth than previously allocated. This situation may arise when other devices complete their existing data transfers, and release their assigned data slots. Other circumstances for data slot reallocation may also be appropriate including a target slave device requesting to receive less data than it is currently set up to receive due to internal throughput restrictions, for example.

As noted above, the master device assigns a variable-length data slot to requesting slave devices. Also noted above, the master device may dynamically alter or change the current data slot assignment including the slot start time and/or the slot length. In carrying out the data slot assignment and reassignment, the master device considers the minimum and maximum bandwidth request accompanying the REQ request. The master device attempts to fulfill such a bandwidth request within the minimum and maximum range specified without having to perform a data slot reallocation. However, a data slot reallocation may be appropriate in order to fulfill a REQ request if overall transmit time is reduced. It is reduced if the sum of the time required to reallocate the data slot section and the overall transmit time after reallocation is smaller than the overall transmit time without reallocation. Several factors or considerations as is known in the art may be used to ascertain whether overall transmit time would be reduced by a data slot reallocation.

The MAC layer protocol of the present invention may be utilized in various network configurations and topologies including, for example, guided or wired media as well unguided or wireless media.

The master device described herein, in addition to carrying out its functions as a master device, may also carry out functions as a slave device as described above. For example, the master device may also engage in data transfer of non-protocol related data with a slave device.

An object of the invention is to provide a Medium Access Control layer protocol which overcomes the deficiencies in the prior art.

Another object of the invention is to provide a Medium Access Control layer protocol which provides Quality of Service guaranties to the Network layer, the Transport layer, the Session layer, the Presentation layer, and the Application layer of the Open Systems Interconnection reference model.

Another object of the invention is to provide a Medium Access Control layer protocol and method for use in a network system which provides a Time Division Multiple Access frame definition having variable-length data slots for data transmission, each data slot having a granularity of one bit.

Another object of the invention is to provide a Medium Access Control layer protocol and method for use in a network system which provides dynamic data slot requisition, where the data slot has an adaptable or variable length.

Another object of the invention is to provide a Medium Access Control layer protocol and method for use in a network system which provides dynamic data slot allocation, where the data slot has variable length.

Another object of the invention is to provide a Medium Access Control layer protocol and method for use in a network system which provides dynamic data slot reallocation.

Another object of the invention is to provide a Medium Access Control layer protocol and method for use in a network system which provides dynamic data slot reallocation.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure. For example, the illustrative embodiments of the present invention are disclosed executing within an embedded processor, but other technologies could be employed as well.

Figure 3A:
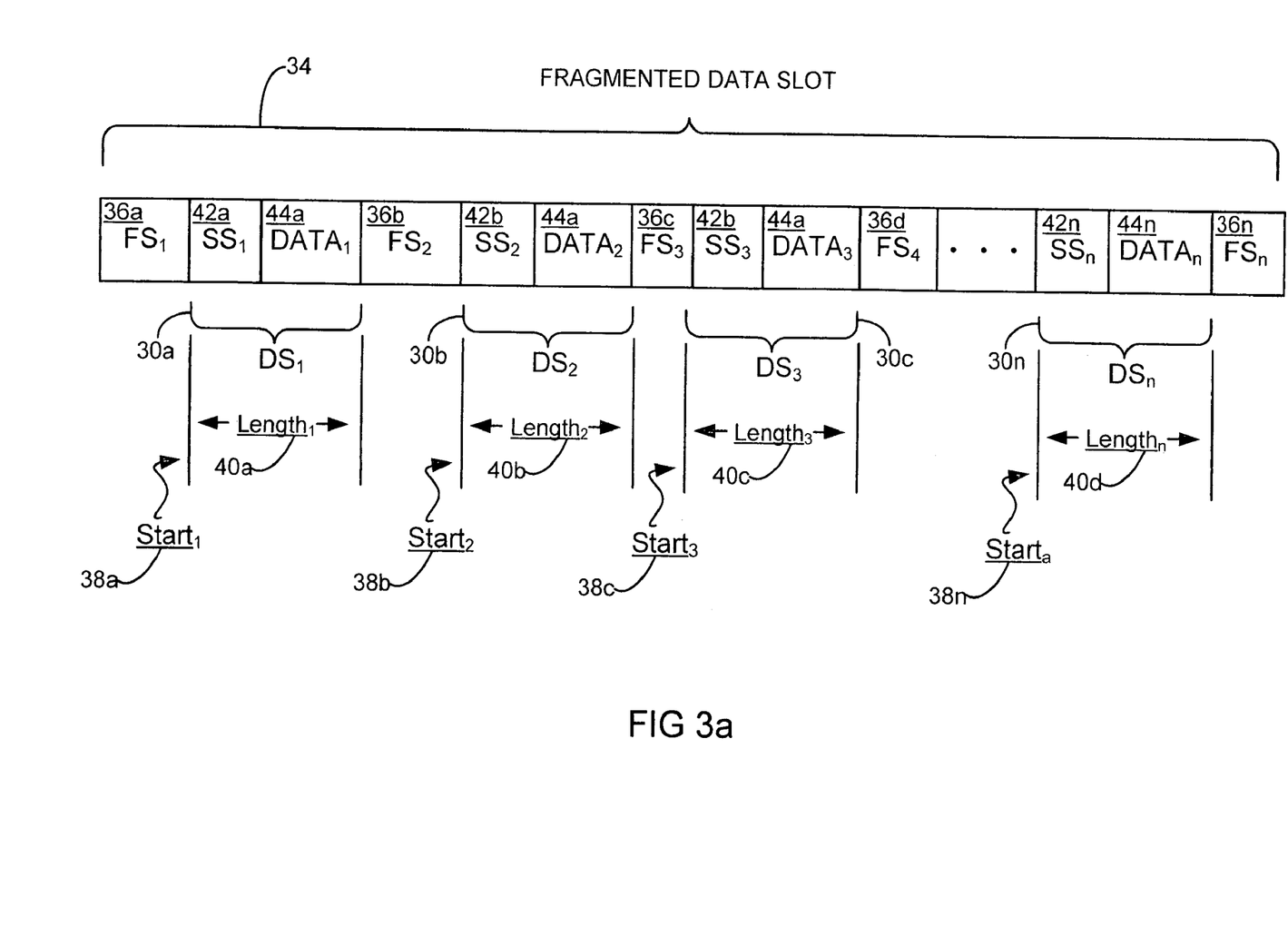
FIG. 3*a* is a block diagram of a fragmented data slot section.
Figure 3B:
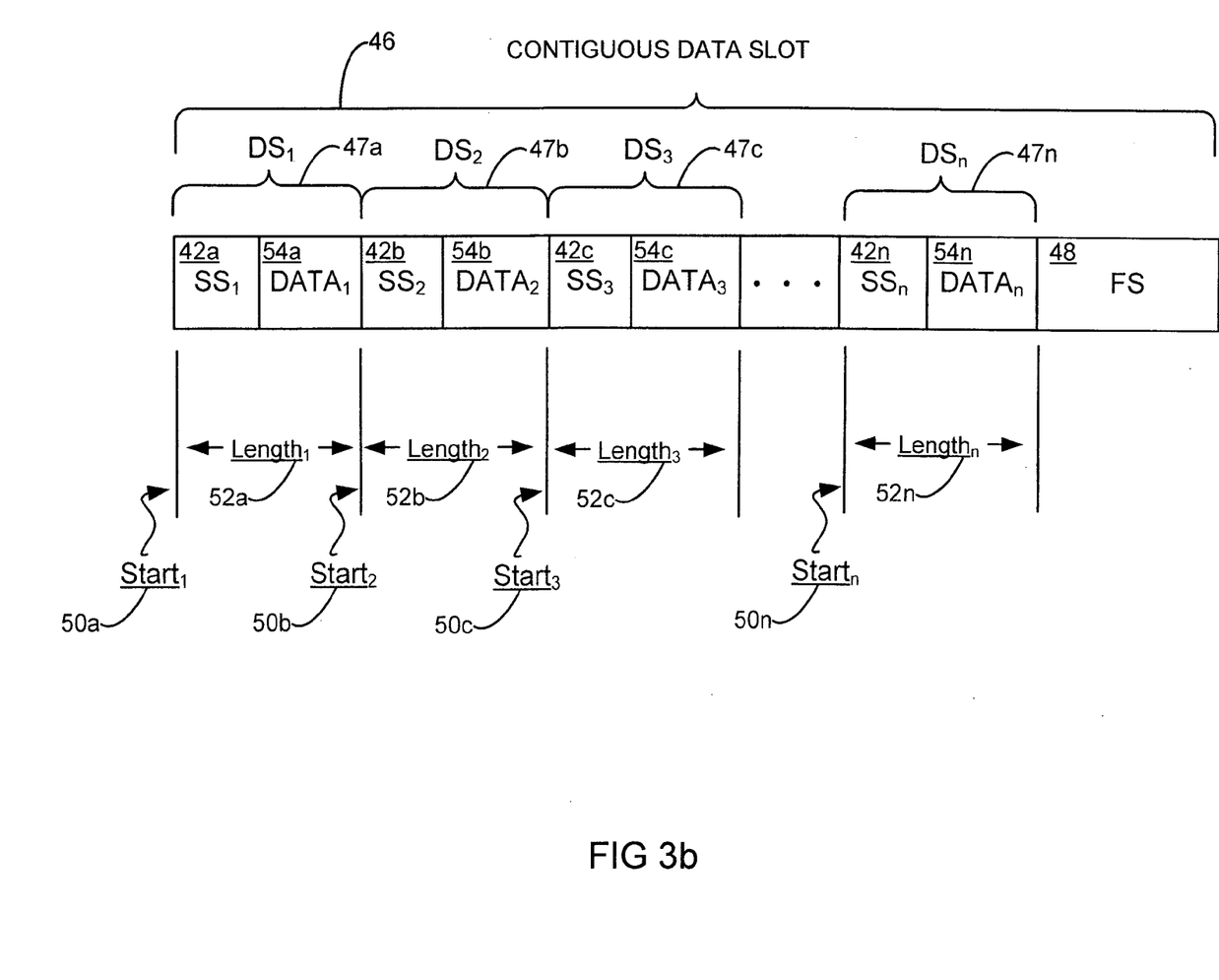
FIG. 3*b* is a block diagram of a contiguous data slot section.
Figure 4:
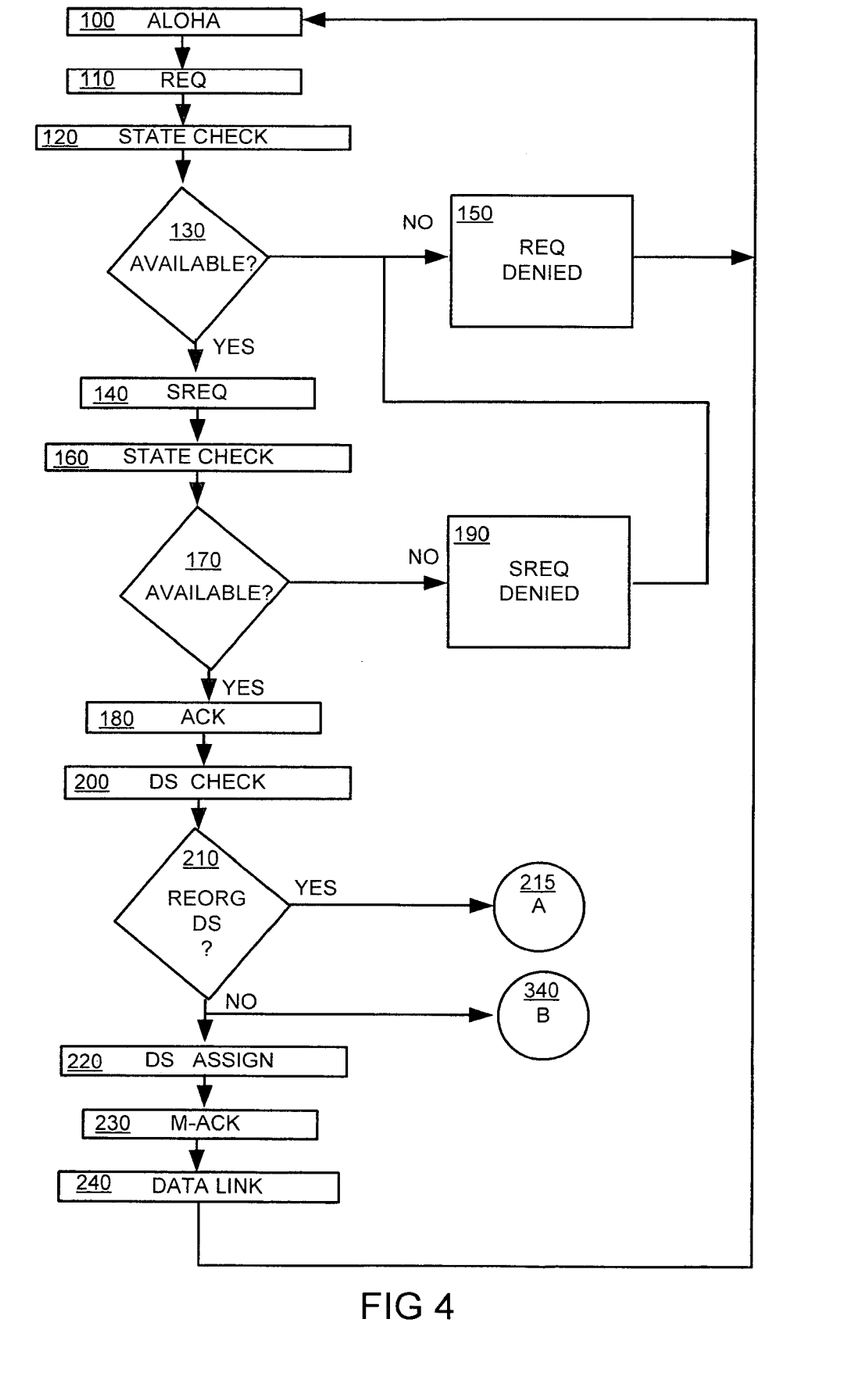
FIG. 4 is a flowchart showing generally the steps involved in dynamic data slot requisition and assignment.
Figure 5:
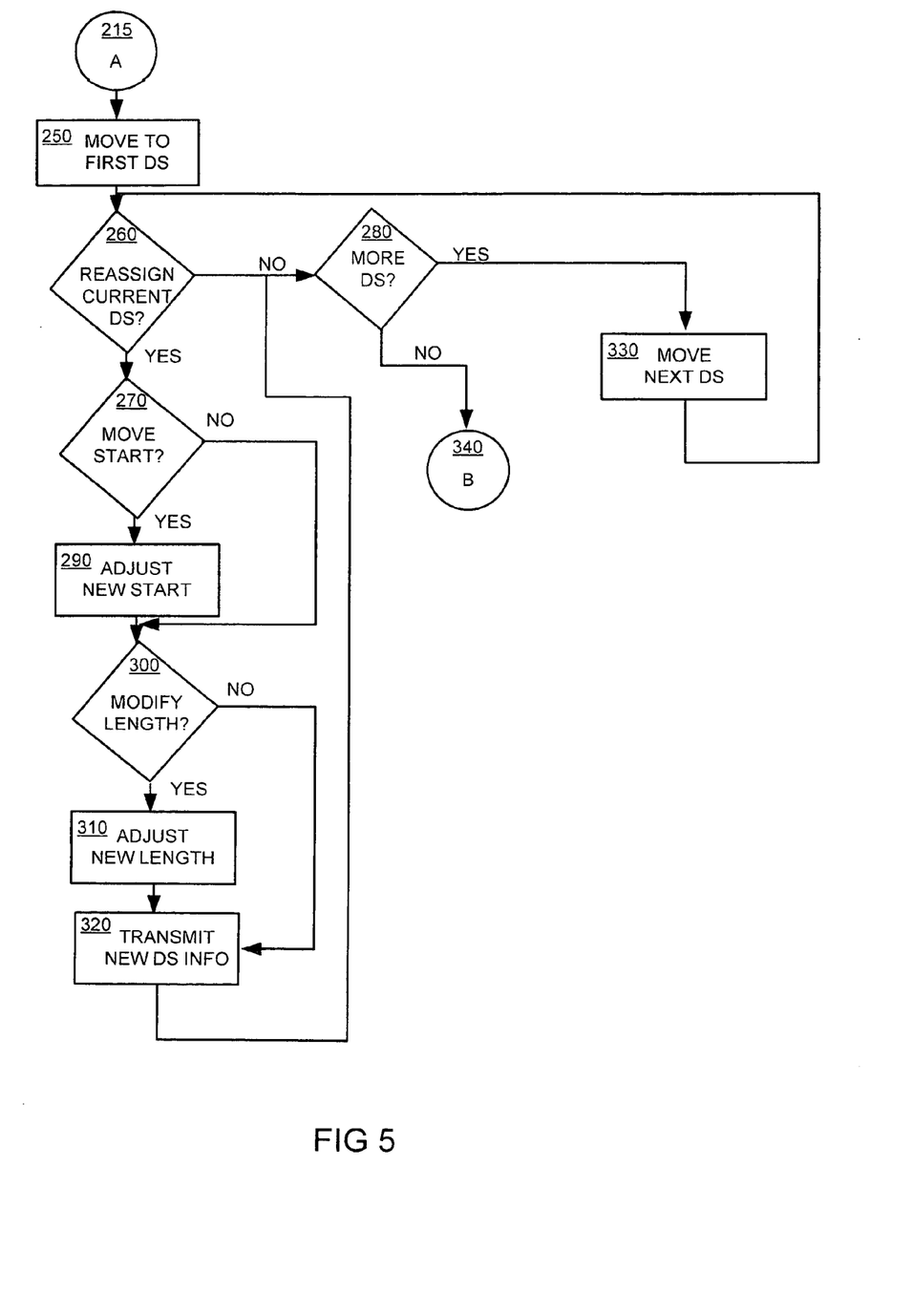
FIG. 5 is flowchart showing generally the steps involved in reallocating a fragmented data slot section.

Referring more specifically to the drawings, for illustrative purposes, the present invention is embodied in the apparatus shown FIG. 1 through FIG. 3*b* and the method outlined in FIG. 4 and FIG. 5. It will be appreciated that the apparatus may vary as to configuration and as to details of the parts, and that the method may vary as to details and the order of the steps, without departing from the basic concepts as disclosed herein. The invention is disclosed generally in terms of a Medium Access Control (MAC) layer protocol, although numerous other uses for the invention will suggest themselves to persons of ordinary skill in the art.

Figure 1:
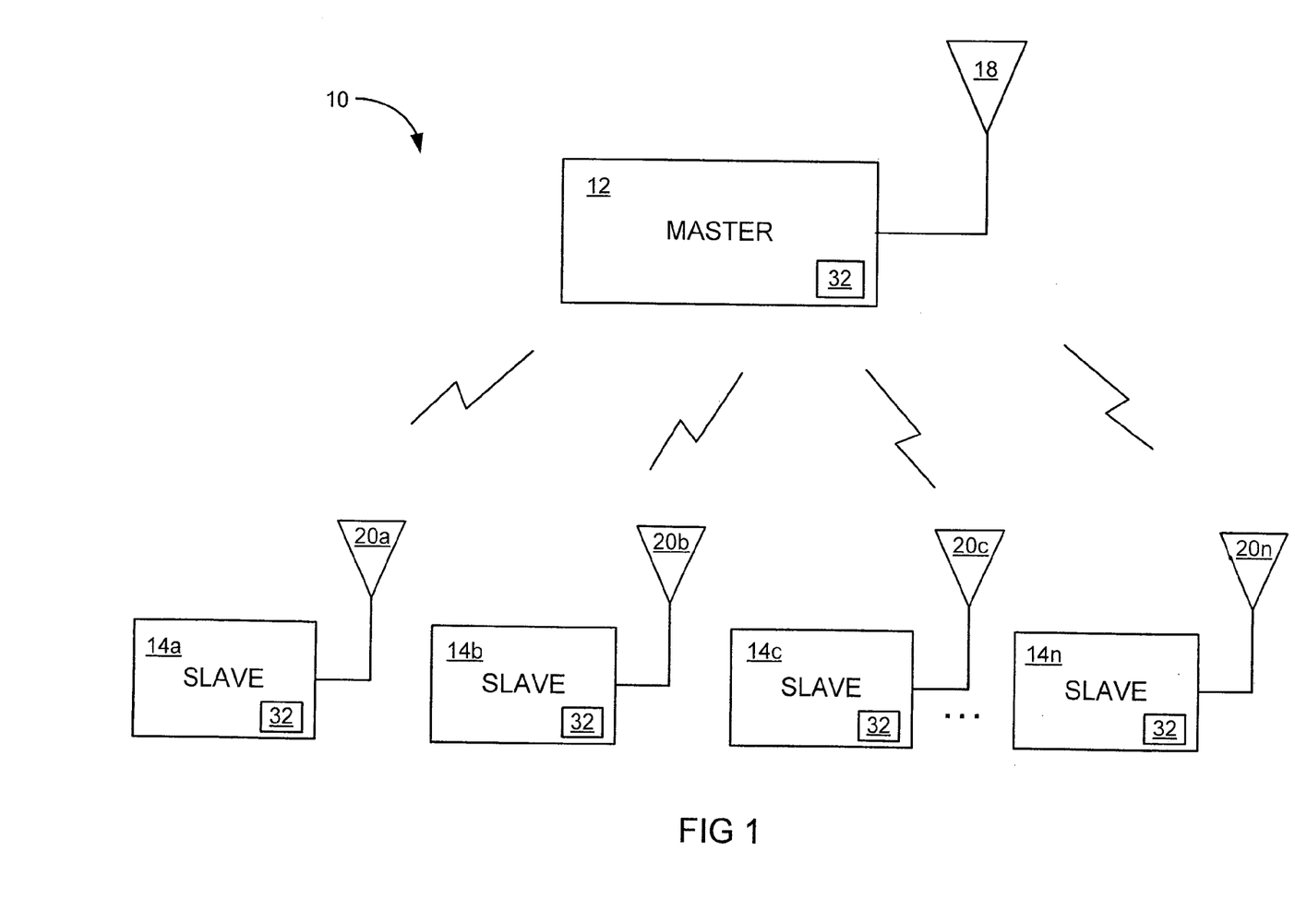
FIG. 1 is a block diagram of an illustrative network system which employs unguided media suitable for use with the protocol of the present invention.

Referring first to FIG. 1, a block diagram of an illustrative network system suitable for use with the protocol of the present invention is shown and designated as 10. The network system 10 comprises a "master" transceiver device 12 and one or more "slave" transceiver devices 14*a* through 14*n*. The master device may also be referred to as a "base" transceiver, and slave devices may also be referred to as "mobile" transceivers. Master transceiver 12 and slave transceivers 14*a* through 14*n* include a transmitter or other transmitting means known in the art (not shown) for transmitting data to the other transceivers of the network 10 via a corresponding antenna 18, 20*a* through 20*n*. Transceivers 12, 14*a* through 14*n* further include a receiver or other receiving means known in the art (not shown) for receiving data from the other transceivers via its corresponding antenna 18, 20*a* through 20*n*. While the present invention is described in association with the wireless system 10, the MAC protocol of the present invention may also be utilized with various other communication systems.

As described in more detail below, the protocol software of the present invention provides functions, routines and algorithms that are executed on the master device 12 and slave devices 14*a* through 14*n* of the network 10. Each network device 12, 14*a* through 14*n* also includes circuitry or like hardware (not shown) as is known in the art for executing the MAC protocol of the present invention at the MAC layer of the device. In an illustrative embodiment, the MAC protocol is run or is otherwise executed on an embedded processor (not shown) within each device 12, 14*a* through 14*n*.

The MAC protocol of the present invention provides services at the MAC sublayer of the Data Link layer according to the Open Systems Interconnection (OSI) reference model. The Logical Link Control (LLC) sublayer comprises the other (upper) portion of the Data Link layer and provides virtual linking services to the Network layer of the OSI reference model. The MAC layer protocol of the present invention may be used in a variety of network configurations and topologies including, without limitation, wired or guided networks and wireless or unguided networks. The network may include various devices as is known in the art including, without limitation, computers, monitors, televisions, hubs, routers, gateways, speakers, microphones, radios, compact disk units, video cassette units, digital video disk units, mini-disk units, and other appliances which may participate in a communication network.

Generally, the invention provides the MAC sublayer software which is executed on circuitry or like hardware (not shown) within devices of the network system as is known in the art. Typically, the MAC software is programmed into and executed on integrated circuit residing in the various network devices. A data link interface (not shown) provides a data path between the MAC layer implementation of the present invention to its "peer entities" which are the Network layer implementation (not shown) and the Physical layer implementation (not shown) as is known in the art. A typical communication interface provides a data path for passing an Interface Data Unit (IDU) as is known in the art.

Figure 2:
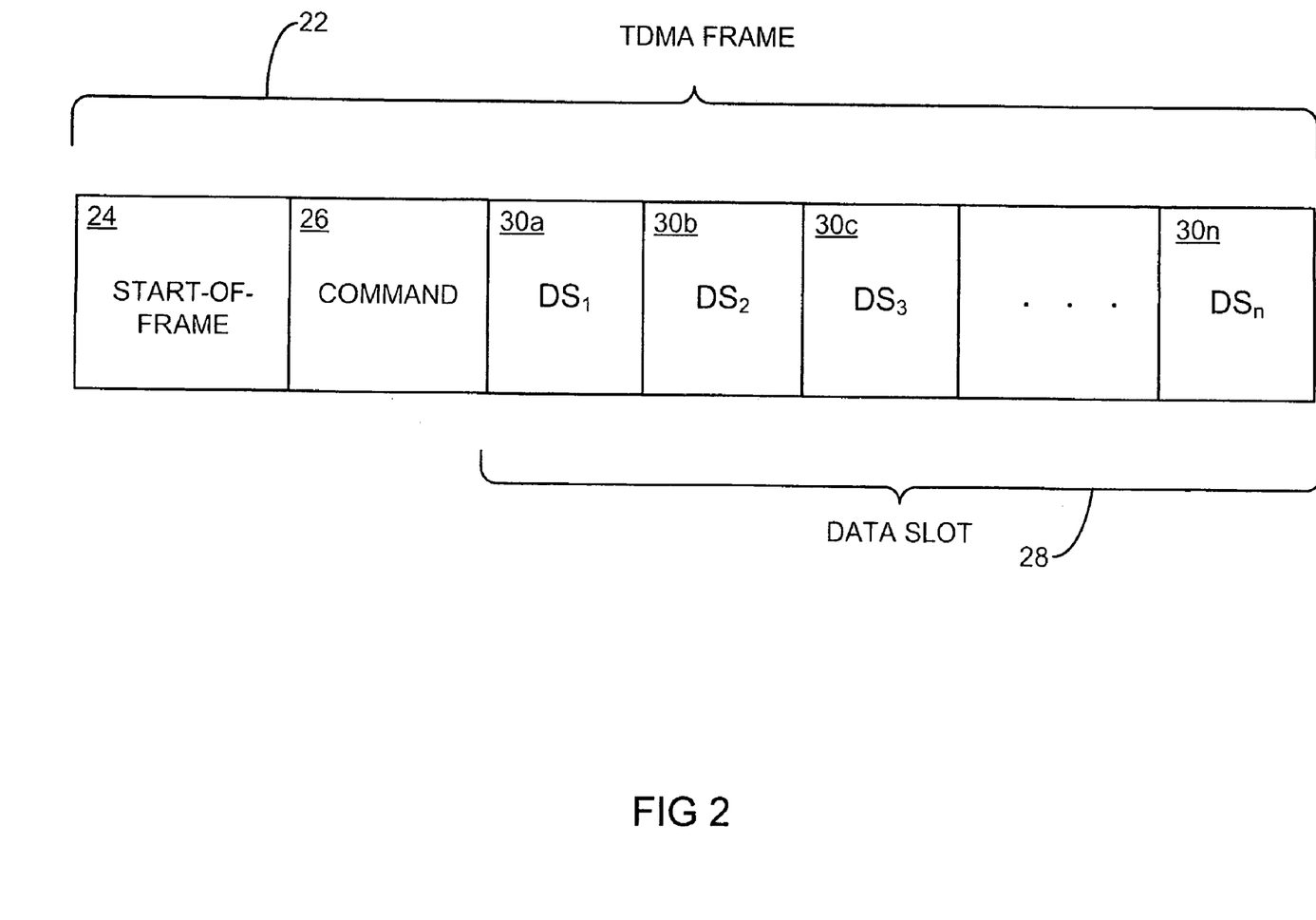
FIG. 2 is a Time Division Multiple Access protocol frame definition in accordance with the present invention.

Referring now to FIG. 2, as well as FIG. 1, a Time Division Multiple Access (TDMA) frame definition is shown and generally designated as 22. TDMA frame 22 is an illustrative frame arrangement provided by the MAC layer protocol of the present invention. In general, the MAC layer of the present invention provides the master device 12 with the functions and routines for carrying out the operation of managing each TDMA frame 22 which is communicated in the network system 10 as described below. The MAC layer protocol also provides the slave device 14a through 14n with the functions and routines for carrying out the operation of exchanging protocol messages with the master device 12 and the other slave devices, and exchanging data with other slave devices. Layer protocol communication is also provided so that the MAC layer may communicate with the Physical layer and the Network layer.

The MAC layer protocol of the present invention divides data transmission time into discrete data "frames" which are structured and configured as TDMA frame 22. Frames are further subdivided into sections. In the preferred embodiment, the TDMA frame 22 comprises a Start-Of-Frame section 24, a command section 26, and a data slot section 28. The data slot section 28 is further subdivided into a plurality of data slots 30a through 30n.

The Start-Of-Frame section 24 contains a synchronizing beacon or "master sync" transmitted by the master device 12, which delineates the start of each new frame. More preferably, this "master sync" is structured and configured to be used for synchronizing timing clocks (not shown) residing in the slave devices 14a through 14n to a master clock (not shown) which resides in the master device 12.

The command section 26 contains protocol messages exchanged between the transceiver devices. Generally protocol messages are communicated between the master device 12 and one or more slave devices 14a through 14n. Protocol messages may comprise, among other things, invitations for requests, requests for data links, requests for discovery, requests for shutdown, requests for termination of data link, acknowledgements, negative acknowledgements and other protocol messages known in the art.

The data slots 30a through 30n are assigned by the master device 12 to requesting slave devices 14a through 14n. Data slots 30a through 30n are provided for data communication exchange and are structured and configured to have variable lengths having a granularity of one (1) bit as allocated by the master device 12. Data slots 30a through 30n are further structured and configured to be dynamically changing wherein the master device 12 may dynamically reallocate and reassign the relative start time and the length of the data slots 30a through 30n within the data slot section 28 of the frame 22. This arrangement allows the master device 12 to dynamically manage the usage of the data slot section 28 to optimize the bandwidth capabilities of the transport medium of the network and the devices of the network. Thus, the master device 12 may allocate a wider data slot to a slave device which can utilize a wider bandwidth. Conversely, the master device may also allocate a narrower data slot to a slave device which has more limited bandwidth capabilities. The method of requesting and assigning variable length data slots is described in further detail in conjunction with FIG. 4 below.

The invention includes a framing control function 32 associated with the devices of the network. The framing control function 32 carries out the operation of generating and maintaining the time frame information. In the master device 12 the framing control function 32 delineates each new frame by Start-Of-Frame (SOF) symbols. In the preferred embodiment, the SOF symbols are unique symbols which do not appear anywhere else within the frame. These SOF symbols serve as the "master sync" for the network and are transmitted in the Start-Of-Frame section 24 of frame 22.

These SOF symbols are used by the framing control function 32 in each of the slave devices 14a through 14n on the network to ascertain the beginning of each frame 22 from the incoming data stream using mechanisms known in the art including, for example, correlators, phase lock loop functions, and phase offset detectors and controllers. For example, in one illustrative embodiment, the invention utilizes a 10-bit SOF "master sync" code of "0111111110". Various encoding schemes known in the art may be use to guarantee that the SOF code will not appear anywhere else in the data sequence of the frame. A common encoding scheme for 8-bit data is a 4B/5B encoding scheme where 8-bit data words are encoded into 10-bit data words. Once frame synchronization is established between the slave devices 14a through 14n and the master device 12, the slave devices can proceed with protocol communication with the master device 12.

In the preferred embodiment, the length of the frame 22 is predetermined and is fixed for a specific network use. In an alternative arrangement, the size of frame 22 may be of variable length as dynamically set forth by the master device 12 to accommodate changing network needs or a changing environment. The framing control function 32 in the slave devices 14a through 14n provide mechanisms known in the art, such as correlators, phase lock loop functions, and phase offset detectors and controllers, which allow the slave devices to reestablish frame synchronization with the master device 12 when the size or length of frame 22 is altered by the master device 12.

The master device 12 carries out the operation of managing network data communication via the exchange of "protocol messages" in the command section 26 of frame 22 as described in copending application entitled "MEDIUM ACCESS CONTROL PROTOCOL FOR CENTRALIZED WIRELESS NETWORK COMMUNICATION MANAGEMENT" having application Ser. No. 10/427,895, filed Apr. 30, 2003 which is expressly incorporated herein by reference.

Each device operates as a finite-state machine having at least three states: offline, online, and engaged. Each slave device maintains and tracks its state by storing its state information internally, usually in random access memory (RAM) (not shown) or other memory means known in the art. The state of each slave device is further maintained and tracked by the master device 12 by storing the states of the slaves in a master state table (not shown) stored in RAM.

Each slave device 14a through 14n is normally set to "offline" after its initial activation. Each slave device must first be "registered"with the master device 12 before the slave device may engage in data communication with the other slave devices of the network. Once a device is registered with the master device 12, the device is considered "online" and ready for communication. The registration sequence is described in further detail in copending application entitled "MEDIUM ACCESS CONTROL PROTOCOL FOR CENTRALIZED WIRELESS NETWORK COMMUNICATION MANAGEMENT" having application Ser. No. 10/427,895 filed Apr 30, 2003 which is expressly incorporated herein by reference.

A slave device that is in the "online" state is ready to send or receive data from the other devices on the network 10. Additionally, a slave device is in the "online" state if it is not currently engaged in communication with other slave devices.

A slave device is "engaged" when the device is currently communicating with one or more slave devices. For example, where a source slave device is transmitting audio signal data to a target slave device, both the source and target slave device are in the "engaged" state.

The command section 26 of TDMA frame 22 provided by the MAC protocol of the present invention is structured and configured to operate in a "slotted ALOHA" mode and a "TDMA" mode as determined by the master device 12. In general, the slotted ALOHA mode is used by the master device 12 to invite protocol messages from the slave devices. The master device 12 periodically broadcasts an ALOHA message to invite slave devices to send their pending protocol messages. This arrangement is known as "slotted ALOHA" because all protocol messages including the ALOHA broadcast are sent during a predetermined time slot. In the preferred embodiment, the ALOHA broadcast is transmitted in command section 26 every three seconds. Responsive to this ALOHA packet and in the next immediate TDMA frame, a slave device transmits its protocol message to the master device 12 in command section 26. The operation of the slotted ALOHA mode is described in further detail in copending application entitled "MEDIUM ACCESS CONTROL PROTOCOL FOR CENTRALIZED WIRELESS NETWORK COMMUNICATION MANAGEMENT" having application Ser. No. 10/427,895, filed Apr. 30, 2003 which is expressly incorporated herein by reference.

The TDMA mode is active when the master device 12 and the slave device which answered the ALOHA message are engaged in a protocol sequence. Such protocol sequences include, for example, a discovery sequence, a shutdown sequence, a data link request sequence, a link service request sequence, a data link terminate sequence, and a service terminate sequence, among others. The method for carrying out these protocol sequences is described further in copending application entitled "MEDIUM ACCESS CONTROL PROTOCOL FOR CENTRALIZED WIRELESS NETWORK COMMUNICATION MANAGEMENT" having application Ser. No. 10/427,895, filed on Apr. 30, 2003 which is expressly incorporated herein by reference. The TDMA mode continues until the entire protocol sequence is completed.

Referring next to FIG. 3a, as well as FIG. 1 and FIG. 2, a block diagram of a fragmented data slot section is shown and generally designated as 34. Fragmented data slot section 34 is shown having a "fragmented" structure wherein assigned data slots 30a through 30n are separated by free time blocks 36a through 36n. Data slot section 28 takes on the structure of fragmented data slot section 34 over the course of transmit time as data slots are assigned, released and then reassigned and because data slot assignments have varying lengths and varying durations of occupancy.

Each data slot 30a through 30n has a corresponding slot start time 38a through 38n and corresponding slot length 40a through 40n. The slot start time 38a through 38n corresponds to the time position within the data slot section 28 of the frame at which point the device begins its transmission. The slot length 40a through 40n measured from the slot start time provides the time position within the frame at which transmission is terminated for the data slot for each frame. The slot lengths 40a through 40n correspond to the bandwidth allocated to the devices within the data slot section 28 of the frame and may be of varying lengths as assigned by the master device 12.

Each data slot 30a through 30n comprises a corresponding slave sync symbol 42a through 42n and data payload 44a through 44n. The slave sync symbols 42a through 42n are used by a source slave device for providing timing synchronization signals to a corresponding target slave device to accommodate for propagation delays between the source and target slave devices. Propagation delays vary in length depending on the distance between source and target slave device. As described above, the master sync symbols 24 provides timing signals to allow slave devices to synchronize with the master clock of the master device 12. Likewise, the slave sync symbols 42a through 42n are symbols which allow target slave devices to synchronize with corresponding source slave devices using similar synchronization algorithms such as phase offset detectors and controllers. Proper target to source slave device synchronization is fundamental for reliable data communication exchange between the slave devices.

The data payload 44a through 44n contains the encoded actual data or bit information which is transmitted from the source device to the target device. The MAC layer at the target slave device receives the transmitted data payload 44a through 44n and provides such information to its corresponding Network layer for further processing as in known in the art.

Referring now to FIG. 3b, as well as FIG. 1 through FIG. 3a, a block diagram of a data slot section with a contiguous block of assigned data slots is shown and generally designated as 46. Contiguous data slot section 46 is shown having a "defragmented" structure wherein data slots 47a through 47n are not separated by free time blocks as in the data slots 30a through 30n in fragmented data slot section 34. Rather, the free time blocks have been consolidated into a single free time block 48 within the data slot section 28. Data slot section 28 takes on the structure of contiguous data slot section 46 normally after a data slot reallocation step as described below in conjunction with FIG. 5. Data slot section 28 also takes on the structure of contiguous data slot section 46 during initial assignment of data slots where the data slot section 28 is initially empty and is subsequently apportioned into data slots 47a through 47n. However as noted above, data slot section 28 takes on the structure of fragmented data slot section 34 over the course of transmit time as data slots are assigned, released and then reassigned.

Contiguous data slot section 46, like fragmented data slot section 34, includes a plurality of data slot assignments 47a through 47n. Each data slot 47a through 47n includes a corresponding slot start time 50a through 50n and a slot length 52a through 52n. Normally after the reallocation step, the slot start time 50a through 50n for the corresponding data slot 47a through 47n is different from the slot start time 38a through 38n as in fragmented data slot section 34. The slot length 52a through 52n in contiguous data slot section 46 may also differ from the slot length 40a through 40n in fragmented data slot section 34 subsequent to data slot reallocation.

Each data slot 47a through 47n comprises a corresponding slave sync symbol 42a through 42n and data payload 54a through 54n. The slave sync symbols 42a through 42n, as in fragmented data slot section 34, are used by the corresponding source slave devices for providing synchronization timing signals to corresponding target slave devices to accommodate for propagation delays. In general, the slave sync symbols 42a through 42n do not change after data slot section reallocation.

The data payload 54a through 54n, like the data payload 44a through 44n for fragmented data slot section 34, contains the encoded actual data or bit information which is transmitted from the source device to the target device. The data payload 54a through 54n may be allocated a different bandwidth from data payload 44a through 44n depending on whether the new slot length 52a through 52n is different from the corresponding slot length 40a through 40n.

While contiguous data slot section 46 is shown with the free time block 48 consolidated at the end of the data slot section 28, other alternative structures may be used as well to provide a functional contiguous data slot arrangement such as, for example, providing a nominal "free time block" (not shown) between each data slot 47a through 47n to provide a "propagation delay buffer" between each data slot 47a through 47n. Such a "propagation delay buffer" would provide nominal space between data slots 47a through 47n to "buffer" data slot transmission interference or overlap which may arise during data slot transmission because of transmission propagation delays. Other arrangements known in the art for providing a contiguous data slot section may also be used.

The method and operation of the invention will be more fully understood by reference to the flow charts of FIG. 4 and FIG. 5. FIG. 4 is a flowchart showing generally the steps involved in dynamic data slot requisition and assignment. FIG. 5 is a flowchart showing generally the steps involved in reorganizing a fragmented data slot section. The order of steps as shown in FIG. 4 through FIG. 5 and described below are only exemplary, and should not be considered limiting.

Referring now to FIG. 4, as well as FIG. 1 through FIG. 3b, there is shown generally the method of dynamically requesting and assigning a variable-length data slot to a requesting or source slave device and a target slave device. This method is a modified data link request (REQ) and service request (SREQ) sequence as described in copending application entitled "MEDIUM ACCESS CONTROL PROTOCOL FOR CENTRALIZED WIRELESS NETWORK COMMUNICATION MANAGEMENT" having application Ser. No. 10/427,895, filed Apr. 30, 2003 which is expressly incorporated herein by reference. This protocol exchange arises when a first requesting or source slave device requests a data link with a second target slave device. The data link, once established, allows the two slave devices to directly transmit data to each other via the assigned data slot.

At step 100, the master device 12 periodically transmits an ALOHA broadcast in the command section 26 of the TDMA frame 22 to invite protocol messages from "offline", "online", and "engaged" slave devices. In the preferred embodiment, the ALOHA broadcast is transmitted every three seconds. Step 110 is then carried out.

At step 110, a requesting slave device has received the ALOHA broadcast of step 100. A requesting device is one whose MAC layer has received a communication directive from the Network layer. By way of illustration and not limitation, such communication instruction may be in the form of IDU messages from the Network layer. Such IDU messages may comprise instructions to transmit or receive data from another slave device. The IDU messages from the Network layer may include one or more Quality of Service (QoS) parameters for data transmission. As noted above, such QoS parameters may include, for example, the size of the data to be transferred, a latency range specification, or a bandwidth range requirement for optimal performance during data transfer.

Also at step 110, the MAC makes a data link request (REQ) to the master device to negotiate for a data slot in the frame. This REQ will typically include the QoS parameters and other relevant data such as the identity of the source slave device and the target slave device as known in the art. The REQ is transmitted in the command section 26 of the next immediate frame to the master device 34 following the receipt of the ALOHA message transmitted in step 100. Step 120 is then carried out.

At step 120, the REQ request is received by the master device 12. The master device 12 queries the master state table maintained by the master device 12 to ascertain the state of the requesting device of step 110. Additionally, the master device 12 queries the master state table to ascertain the state of the target device indicated in the REQ request of step 110. Step 130 is then carried out.

At step 130, the master device determines whether the requesting device and the target device are online. As described above, a slave device must be registered as online with the master device 34 before such slave device communicates with a second slave device. In this regard, a slave device which is "offline" according to the master state table is denied a data link request. Likewise a slave device which is requesting to communicate with a target slave device which is "offline" according to the master state table, or cannot establish a communication link, is also denied a data link request. If the master determines that the requesting device and the target device are available to establish a communication link, then step 140 is carried out. Otherwise, step 150 is carried out.

At step 150, the master device 12 denies the REQ request of step 110. The master device may carry out any means known in the art for denying the REQ request including, for example, communicating a Negative Acknowledgement (NACK). Copending application, entitled "MEDIUM ACCESS CONTROL PROTOCOL FOR CENTRALIZED WIRELESS NETWORK COMMUNICATION MANAGEMENT" having application Ser. No. 10/427,895, filed Apr. 30, 2003 which is expressly incorporated herein by reference, includes improved sequence means for denying the REQ request and may be used in conjunction with step 150. Step 100 is then carried out again.

At step 140, the master device 12 determines that the source and target devices are available for the data link request of step 110. The master device 12 then proceeds with a link service request sequence by transmitting a SREQ message to the target device indicated in the REQ request of step 110. The SREQ message identifies the source slave device as well as the QoS parameters of the REQ request of step 110. Step 160 is then carried out.

At step 160, the target device receives the SREQ message from step 140. The target device queries its internal state information to determine the current state of the target device. Step 170 is then carried out.

At step 170, the target device determines whether it can accommodate a communication link with the source device and whether the requested QoS can be satisfied by the target device. If the target device is unable to accommodate such a communication link with the source device, step 190 is carried out. Otherwise, step 180 is carried out.

At step 190, the target transmits a "BUSY" protocol message in the command section 26 to the master device 12 to indicate that the target device is currently not able to accommodate a connection with the source device. The BUSY message may also indicate the reason for its inability to engage in communication with the source device and may provide the bandwidth which can be accommodated by the target device. Step 150 is then carried out.

At step 180, the target device transmits an "ACK" message to the master device 12 to indicate its acknowledgement of the SREQ message of step 140 and its acceptance of the data link request. This ACK message may additionally indicate the bandwidth capabilities of the target slave device, including for example a bandwidth range in which the target device may communicate. Step 200 is then carried out.

At step 200, the master device 12 receives the ACK message of step 180. The master device 12 interprets the ACK message as an acknowledgement and acceptance of the SREQ message of step 140. The master device 12 then examines the current data slot assignments within data slot section 28 to ascertain or otherwise determine whether the bandwidth specifications as set out in the REQ request of step 110 and the ACK message of step 180 can be fulfilled using the free time blocks of the current data slot section 28. As noted above, the free space is initially contiguous as shown in FIG. 3b. However, at other times, the free space may be fragmented across the data slot section 28 as shown in FIG. 3a. In the latter case, the master device 12 determines whether consolidating the free time blocks 36a through 36n would satisfy the bandwidth specifications as set out in the REQ and ACK message. Step 210 is then carried out.

At step 210, the master device 12 determines whether the data slot section 28 will be reorganized to consolidate the free time blocks 36a through 36n. Several factors as is known in the art may be used to determine whether the network system 10 would benefit by such a reorganization step including, for example, the degree of fragmentation within the data slot section 28. Where there is only a single free time block, such as during initial startup, reorganization of the data slot section is not normally invoked. In certain cases, such as when network traffic is light, reorganization may be invoked in order to provide a slave device with more bandwidth than originally assigned. As noted above, various factors known in the art may be used to determine whether reorganizing data slot section 28 would optimize the network communication. If the master device 12 determines that reorganization is to be carried out, step 215 is carried out. Step 215 comprises the series of steps shown in FIG. 5, which are described below. If the master device 12 determines that reorganization is not to be carried out, step 220 is carried out.

At step 220, the master device 12 assigns a data slot 47n within the data slot section 28 to the requesting source device and the target device for data communication. The data slot assignment comprises a slot start time 50n and a slot length 52n. The slot length 52n conforms to the bandwidth specifications set forth in the REQ of step 110 and the ACK message of step 180. In general, the master device 12 assigns a slot length 52n which falls within the minimum and maximum bandwidth limits set forth in the REQ message and which falls within the bandwidth capabilities of the target devices as specified in the ACK message, as well as the available network bandwidth. More preferably, the master device 12 assigns a slot length 52n which matches or closely matches the maximum bandwidth request of the REQ message and which falls within the bandwidth capabilities of the target devices as specified in the ACK message. Step 230 is then carried out.

At step 230, the master device 12 communicates a Master-Acknowledgement (M-ACK) protocol message to the requesting source device of step 110 and the target slave device of step 140 to indicate the authorization of the data link REQ request of 110 and to indicate the slot start time 50n, and the slot length 52n as determined in step 220. Step 240 is then carried out.

At step 240, the requesting source device of step 110 and the target slave device of step 140 change into "engaged" mode and initiate a data link according to steps known in the art. Normally, the target and slave devices attempt to synchronize with each other, and then proceed with the data transfer. After completing the transfer, the source and target devices transmit a protocol message to the master device 12 to indicate the termination of the data link. The process is then repeated by carrying out step 100 again.

Referring now to FIG. 5, as well as FIG. 1 through FIG. 4, there is shown generally the method of dynamically reallocating the data slots 30a through 30n in data slot section 28 following step 210 and step 215 of FIG. 4. As noted above, the master device 12 may change the data slot assignments within the data slot section 28 for a number of reasons. The most common reason for reallocation is for the purpose of consolidating the fragmented free time blocks 36a through 36n as shown in FIG. 3a into a consolidated free time block 48 as shown in FIG. 3b. Another reason may be to alter one or more of the slot lengths 40a through 40n currently assigned. Decreasing the slot length generally provides more free time within the data slot section 28. Increasing a device's slot length generally provides increased bandwidth to the device. The protocol of the present invention provides a reallocation process embodied in software which is executed by the master device as described herein.

At step 250, the reallocation process initializes by inspecting the first data slot assignment. Various compaction algorithms known in the art may be used to reallocate the data slots. In the present exemplary method, the sorting algorithm iterates through each data slot assignment 30a through 30n starting with the first data slot 30a. Step 260 is then carried out.

At step 260, the reallocation process determines whether the current data slot inspected will be reassigned. A data slot reassignment may include an adjusted slot start time and/or an adjusted slot length. As described above, various factors known in the art may be utilized to determine whether data slot reassignment is appropriate for one or more currently assigned data slots. If the reallocation process determines that the current data will be reassigned step 270 is carried out. Otherwise step 280 is carried out.

At step 270, the reallocation process determines whether the slot start time will be adjusted for the data slot currently inspected. Start time adjustment may be appropriate, for example, to consolidate the fragmented free time blocks 36a through 36n into the consolidated free time block 48. If the reallocation process determines that the currently inspected data slot will be assigned a new start time, step 290 is carried out. Otherwise step 300 is carried out.

At step 290, the reallocation process assigns the currently inspected data slot a new start time. Normally, the reallocation process assigns a new start time, which is previous to the currently assigned start time within data slot section 28. For example, contiguous start time 50a is previous to fragmented start time 38a within data slot section 28. Step 300 is then carried out.

At step 300, the reallocation process determines whether the slot length will be adjusted for the currently inspected data slot. Decreasing the slot length generally frees up bandwidth within the data slot section 28. Increasing the slot length generally provides increased bandwidth to devices with currently assigned data slots. If the reallocation process determines that the slot length will be adjusted, step 310 is carried out. Otherwise, step 320 is carried out.

At step 310, the reallocation process adjusts the slot length for the currently inspected data slot. The reallocation process may increase or decrease the slot length for the currently inspected data slot depending on the bandwidth requirements of the various slave devices 14a through 14n of the network 10 as well as the overall bandwidth traffic on the network 10. Step 320 is then carried out.

At step 320, the master device engages in a protocol exchange sequence with the source and target devices which are assigned to the currently inspected data slot to communicate the new slot start time determined in step 290 and the adjusted start time determined in step 310. Various protocol exchange methods known in the art may be used for such communication. More preferably, the master device utilizes a sequence retransmission request (SRQ) protocol scheme to communicate the adjusted data slot start time and length information. The SRQ protocol scheme is described in copending patent application entitled "MEDIUM ACCESS CONTROL PROTOCOL FOR CENTRALIZED WIRELESS NETWORK COMMUNICATION MANAGEMENT" having application Ser. No. 10/427,895, filed Apr. 30, 2003 which is expressly incorporated herein by reference. Step 280 is then carried out.

At step 280, the reallocation process determines whether there are additional data slots within the data slot section 28 for data slot reassignment. As noted previously, in this present exemplary method, the reallocation process iterates through each currently assigned data slot starting with the first data slot 30a. If the reallocation process determines that there is an additional data slot within the data slot section 28 for data slot inspection and reassignment, step 330 is carried out. Otherwise step 340 is carried out.

At step 330, the reallocation process iterates to inspect the next currently assigned data slot within the data slot section 28. For example, if the previously inspected data slot was 30a, the reallocation process iterates to inspect the next data slot 30b. Step 260 is then repeated until the last data slot 30n is inspected, wherein step 280 determines that there are no additional data slots to be inspected and reassigned.

At step 340, the reallocation process is completed. Steps 220 through 240 of FIG. 4 are then carried out to complete the data slot assignment process.

Accordingly, it will be seen that this invention provides a Medium Access Control layer protocol and method for use in a Time Division Multiple Access network system, which provides variable data slot requisition, variable data slot allocation, and dynamic data slot reallocation. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a network system having a master device and a plurality of slave devices in network communication with said master device, said network system employing a Time Division Multiple Access frame comprising a master sync section, a command section and a data slot section having a plurality of variable-length data slots comprising the steps of:

(a) periodically transmitting an ALOHA message to invite protocol messages by said master device;
(b) receiving a data link request with Quality of service perimeters by a source slave device from an OSI layer above said Medium Access Control layer, said Quality of service parameters including a bandwidth range for data transfer;
(c) transmitting a data link request by said source slave device to said master device in response to said ALOHA message, said data link request including said bandwidth range requirement for data transfer;
(d) receiving said data link request by said master device;
(e) determining the availability of said source slave device and said target slave device for communication;
(f) providing a data slot assignment by said master device to said source slave device and said target slave device, said data slot assignment having a start time for communication and a slot length within said bandwidth range;
(g) communicating said data slot assignment by said master device to said source slave device and said target slave device; and
(h) reallocating current data slots assignments within said frame prior to providing said data slot assignment wherein said step of reallocating comprises:
  (1) iterating through each said current time slot assignment,
  (2) determining whether each said current data block assignment is to be assigned a new slot start time,
  (3) assigning a new slot start time to said current data slot assignments determined to be reassigned,
  (4) determining whether each said current data slot assignment is to be reassigned a new slot length,
  (5) assigning said new slot length to said current data slot assignments determined to be reassigned, and
  (6) communicating said modified data slot assignment by said master device to said source slave device and said target slave device.

2. A product for providing a Medium Access Control Protocol for transmission of data between a plurality of devices in a network having a master device that control TDMA frame generation and a plurality of slave devices wherein each of said plurality of devices includes a processing unit, said product including:

a first set of instructions for directing a processing in said master device to:
  transmit an ALOHA signal in a TDMA frame periodically,
  receive a request from a source slave device for a data transfer between said source slave device and a target slave device wherein said request includes a bandwidth requirement for said data transfer,
  reallocate a plurality of time slots in a TDMA frame for transmission between devices to remove spans of time between consecutive data slots in response to receiving said request for said data transfer,
  assign a new time slot for said data transfer based upon said bandwidth request in response to reallocating said plurality of time slots; and a media readable by said processing unit in said master device that stores said first set of instructions,
  determine whether said source device and said target device are in an on line state, and
  transmit a deny data transfer signal to said source slave device in response to a determination that said source slave device and said target slave device are not in an on-line state.

3. A method for providing data transfer in a network including a master device which controls said data transfers and a plurality of slave devices, said method comprising:

transmitting an ALOHA signal in a TDMA frame periodically from said master device to said plurality of slave device;
receiving a request in said master device from a source slave device for a data transfer between said source slave device and a target slave device wherein said request includes a bandwidth requirement for said data transfer;

reallocating a plurality of time slots in a TDMA frame for transmission between devices by said master device to remove spans of time between consecutive data slots in response to receiving said request for said data transfer;

assigning a new time slot for said data transfer based upon said bandwidth request in response to reallocating said plurality of time slots;

determining whether said source device and said target device are in an on-line state; and transmitting a deny data transfer signal from said master device to said source slave device in response to a determination that said source slave device and said target slave device are not in an on-line state.

4. A product for providing a Medium Access Control Protocol for transmission of data between a plurality of devices in a network having a master device that control TDMA frame generation and a plurality of slave devices wherein each of said plurality of devices includes a processing unit, said product including:

a first set of instructions for directing a processing in said master device to:

transmit an ALOHA signal in a TDMA frame periodically, receive a request from a source slave device for a data transfer between said source slave device and a target slave device wherein said request includes a bandwidth requirement for said data transfer, reallocate a plurality of time slots in a TDMA frame for transmission between devices to remove spans of time between consecutive data slots in response to receiving said request for said data transfer, assign a new time slot for said data transfer based upon said bandwidth request in response to reallocating said plurality of time slots; and a media readable by said processing unit in said master device that stores said first set of instructions, determine whether said source device and said target device are in an on line state, transmit a deny data transfer signal to said source slave device in response to a determination that said source slave device and said target slave device are not in an on-line state, transmit a request for data transfer to said target slave device, receive an acknowledgement from said target slave device, and wherein assigning said data slot is responsive to receiving said acknowledgement.

5. A product for providing a Medium Access Control Protocol for transmission of data between a plurality of devices in a network having a master device that control TDMA frame generation and a plurality of slave devices wherein each of said plurality of devices includes a processing unit, said product including:

a first set of instructions for directing a processing in said master device to:

transmit an ALOHA signal in a TDMA frame periodically, receive a request from a source slave device for a data transfer between said source slave device and a target slave device wherein said request includes a bandwidth requirement for said data transfer, reallocate a plurality of time slots in a TDMA frame for transmission between devices to remove spans of time between consecutive data slots in response to receiving said request for said data transfer, and assign a new time slot for said data transfer based upon said bandwidth request in response to reallocating said plurality of time slots; and a media readable by said processing unit in said master device that stores said first set of instructions;

wherein reallocation of said plurality of time slots comprises instructions for directing said processing unit to read a one of said plurality of data slots;

determine whether a start time of said data slot must be changed, adjust said start time of said one of said plurality of data slots in response to a determination should start time be changed; and transmit said adjusted to devices using said one of said plurality of time slots for a data transfer.

6. A product for providing a Medium Access Control Protocol for transmission of data between a plurality of devices in a network having a master device that control TDMA frame generation and a plurality of slave devices wherein each of said plurality of devices includes a processing unit, said product including:

a first set of instructions for directing a processing in said master device to:

transmit an ALOHA signal in a TDMA frame periodically, receive a request from a source slave device for a data transfer between said source slave device and a target slave device wherein said request includes a bandwidth requirement for said data transfer, reallocate a plurality of time slots in a TDMA frame for transmission between devices to remove spans of time between consecutive data slots in response to receiving said request for said data transfer, and assign a new time slot for said data transfer based upon said bandwidth request in response to reallocating said plurality of time slots; and a media readable by said processing unit in said master device that stores said first set of instructions;

wherein reallocation of said plurality of time slots comprises instructions for directing said processing unit to read a one of said plurality of data slots; and either:

determine whether a start time of said data slot must be changed, adjust said start time of said one of said plurality of data slots in response to a determination should start time be changed, transmit said adjusted to devices using said one of said plurality of time slots for a data transfer;

or determine whether length of said one of said plurality of time slots must be adjusted, adjust said length in response to a determination that said length of said one of said plurality of time slots must be adjusted, and transmit said adjusted length of said one of said plurality of time slots to devices using said one of said plurality of time slots for a data transfer.

7. A method for providing data transfer in a network including a master device which controls said data transfers and a plurality of slave devices, said method comprising:

transmitting an ALOHA signal in a TDMA frame periodically from said master device to said plurality of slave device;

receiving a request in said master device from a source slave device for a data transfer between said source slave device and a target slave device wherein said request includes a bandwidth requirement for said data transfer;

reallocating a plurality of time slots in a TDMA frame for transmission between devices by said master device to remove spans of time between consecutive data slots in response to receiving said request for said data transfer;

assigning a new time slot for said data transfer based upon said bandwidth request in response to reallocating said plurality of time slots;

determining whether said source device and said target device are in an on-line state;

transmitting a deny data transfer signal from said master device to said source slave device in response to a determination that said source slave device and said target slave device are not in an on-line state;

transmitting a request for data transfer to said target slave device;

receiving an acknowledgement from said target slave device; and wherein assigning said data slot is responsive to receiving said acknowledgement.

8. A method for providing data transfer in a network including a master device which controls said data transfers and a plurality of slave devices, said method comprising:

transmitting an ALOHA signal in a TDMA frame periodically from said master device to said plurality of slave device;

receiving a request in said master device from a source slave device for a data transfer between said source slave device and a target slave device wherein said request includes a bandwidth requirement for said data transfer;

reallocating a plurality of time slots in a TDMA frame for transmission between devices by said master device to remove spans of time between consecutive data slots in response to receiving said request for said data transfer;

assigning a new time slot for said data transfer based upon said bandwidth request in response to reallocating said plurality of time slots;

determining whether said source device and said target device are in an on-line state;

transmitting a deny data transfer signal from said master device to said source slave device in response to a determination that said source slave device and said target slave device are not in an on-line state;

transmitting a request for data transfer to said target slave device;

receiving an acknowledgement from said target slave device; and wherein assigning said data slot is responsive to receiving said acknowledgement; and wherein said step of reallocating comprises:
reading a one of said plurality of data slots;
determining whether a start time of said data slot must be changed;
adjusting said start time of said one of said plurality of data slots in response to a determination should start time should be changed; and
transmitting said adjusted to devices using said one of said plurality of time slots for a data transfer.

9. A method for providing data transfer in a network including a master device which controls said data transfers and a plurality of slave devices, said method comprising:

transmitting an ALOHA signal in a TDMA frame periodically from said master device to said plurality of slave device;

receiving a request in said master device from a source slave device for a data transfer between said source slave device and a target slave device wherein said request includes a bandwidth requirement for said data transfer;

reallocating a plurality of time slots in a TDMA frame for transmission between devices by said master device to remove spans of time between consecutive data slots in response to receiving said request for said data transfer;

assigning a new time slot for said data transfer based upon said bandwidth request in response to reallocating said plurality of time slots;

determining whether said source device and said target device are in an on-line state;

transmitting a deny data transfer signal from said master device to said source slave device in response to a determination that said source slave device and said target slave device are not in an on-line state;

transmitting a request for data transfer to said target slave device;

receiving an acknowledgement from said target slave device; and wherein assigning said data slot is responsive to receiving said acknowledgement; and wherein said step of reallocating comprises either the steps of:
reading a one of said plurality of data slots;
determining whether a start time of said data slot must be changed;
adjusting said start time of said one of said plurality of data slots in response to a determination should start time should be changed; and
transmitting said adjusted to devices using said one of said plurality of time slots for a data transfer, or wherein said step of reallocating comprises the steps of:
determining whether length of said one of said plurality of time slots must be adjusted;
adjusting said length in response to a determination that said length of said one of said plurality of time slots must be adjusted; and
transmitting said adjusted length of said one of said plurality of time slots to devices using said one of said plurality of time slots for a data transfer.

* * * * *